(12) United States Patent
Vance

(10) Patent No.: US 7,334,330 B2
(45) Date of Patent: Feb. 26, 2008

(54) THERMALLY INSULATING LAYER INCORPORATING A DISTINGUISHING AGENT AND METHOD FOR INSPECTING THE SAME

(75) Inventor: Steven James Vance, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 514 days.

(21) Appl. No.: 10/833,374

(22) Filed: Apr. 28, 2004

(65) Prior Publication Data

US 2005/0241148 A1 Nov. 3, 2005

(51) Int. Cl.
*B21K 25/00* (2006.01)
*C23C 14/54* (2006.01)

(52) U.S. Cl. ............. 29/889.2; 416/204 A; 416/241 R; 427/8; 427/9

(58) Field of Classification Search ............... 29/889.2, 29/889.7, 889.1, 407.4, 402.13, 402.16; 356/630; 427/8–10, 248.1, 331, 405, 496, 505; 416/241 R
See application file for complete search history.

(56) References Cited

U.S. PATENT DOCUMENTS

| | | | | |
|---|---|---|---|---|
| 3,795,133 A | * | 3/1974 | Fergason et al. | 374/7 |
| 3,995,157 A | * | 11/1976 | Holub et al. | 250/302 |
| 5,338,566 A | * | 8/1994 | Gregory et al. | 427/8 |
| 5,343,146 A | * | 8/1994 | Koch et al. | 324/230 |
| 5,430,376 A | * | 7/1995 | Viertl | 324/227 |
| 5,603,161 A | | 2/1997 | Welsh | |
| 6,013,592 A | | 1/2000 | Merrill et al. | |
| 6,072,568 A | * | 6/2000 | Paton et al. | 356/32 |
| 6,165,542 A | | 12/2000 | Jaworowski et al. | |
| 6,197,424 B1 | | 3/2001 | Morrison et al. | |
| 6,237,723 B1 | | 5/2001 | Salsman | |
| 6,287,511 B1 | | 9/2001 | Merrill et al. | |
| 6,306,515 B1 | | 10/2001 | Goedjen et al. | |
| 6,365,281 B1 | | 4/2002 | Subramanian et al. | |
| 6,534,975 B2 | * | 3/2003 | Beeck et al. | 324/230 |
| 6,538,725 B2 | | 3/2003 | Potyrailo et al. | |
| 6,617,013 B2 | | 9/2003 | Morrison et al. | |
| 6,641,907 B1 | | 11/2003 | Merrill et al. | |
| 6,644,917 B2 | * | 11/2003 | Zhao et al. | 415/200 |
| 6,676,783 B1 | | 1/2004 | Merrill et al. | |
| 6,709,230 B2 | | 3/2004 | Morrison et al. | |
| 6,838,157 B2 | * | 1/2005 | Subramanian | 428/173 |
| 2003/0207155 A1 | | 11/2003 | Morrison et al. | |

* cited by examiner

*Primary Examiner*—David P. Bryant
*Assistant Examiner*—Alexander P Taousakis

(57) ABSTRACT

Thermally insulating layer incorporating a distinguishing agent and method for inspecting the insulating layer are provided. The distinguishing agent may be used for determining a remaining thickness of the thermally insulating layer.

12 Claims, 1 Drawing Sheet

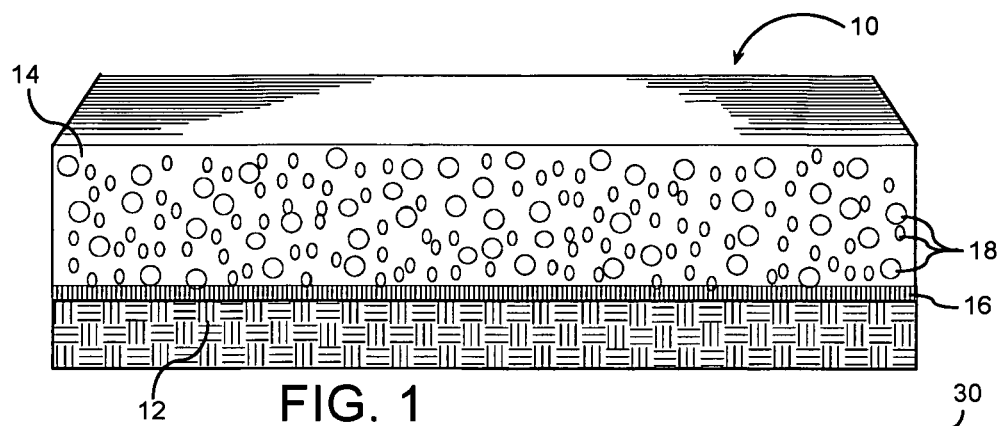
FIG. 1
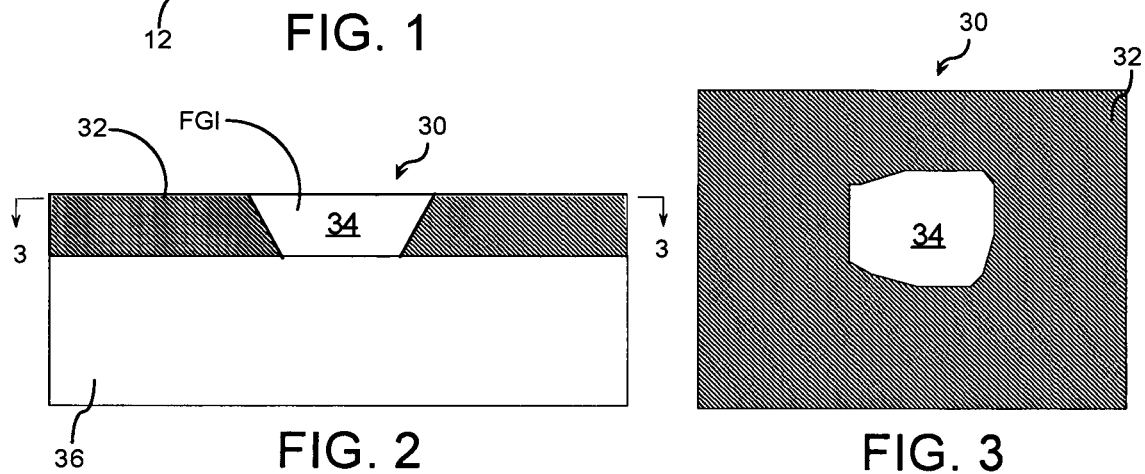
FIG. 2
FIG. 3
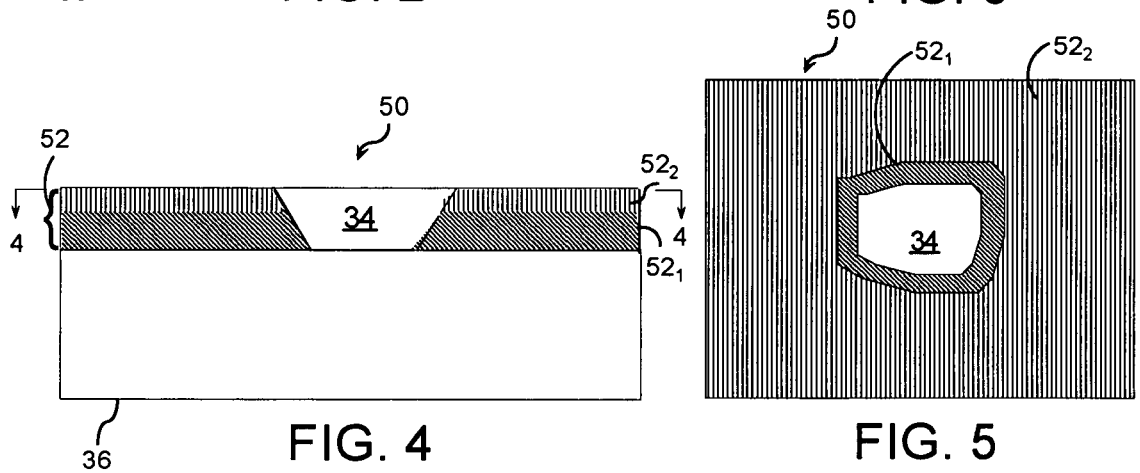
FIG. 4
FIG. 5
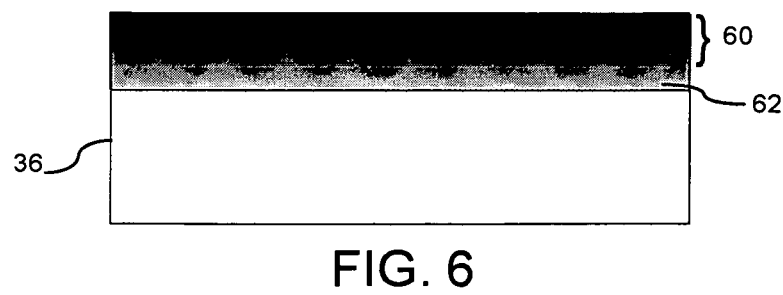
FIG. 6

THERMALLY INSULATING LAYER INCORPORATING A DISTINGUISHING AGENT AND METHOD FOR INSPECTING THE SAME

FIELD OF THE INVENTION

The present invention is generally related to ceramic matrix composites as may be used in a high temperature environment, and, more particularly, to inspection techniques that may be used for determining the thickness of a thermally insulating material applied to the ceramic matrix composite.

BACKGROUND OF THE INVENTION

Commercially available ceramic matrix composites (CMCs) have many potential applications in high temperature environments. CMCs are somewhat limited in their capability for exposure to temperatures exceeding values in the order of approximately 1,200° C. In addition, CMCs typically cannot be cooled effectively under high heat flux conditions because of their relatively low thermal conductivity. Accordingly, it is known to provide a thermally insulating material for application to a ceramic matrix composite substrate material so that the insulated CMC composite can be used in a high temperature environment, such as the hot gas flow path of a gas turbine engine.

U.S. Pat. No. 6,197,424, assigned to the present assignee and incorporated herein by reference in its entirety, describes one example of a thermally insulating material for application to the ceramic matrix composite substrate. More specifically, the '424 patent describes a gas turbine component fabricated from CMC material and covered by a layer of a dimensionally stable, abradable, ceramic insulating material, commonly referred to as friable graded insulation (FGI).

Typically, the thermally insulating material may be susceptible to environmental effects, such as moisture attack, particulate-induced erosion, etc., that over time tend to reduce the thickness of the insulating material. Traditional inspection techniques have been generally unavailable for determining the thickness of the insulating material. For example, visual inspection has been of limited practical utility since the thermally insulating material and the underlying CMC material are essentially visually undistinguishable from one another. Similarly, electromagnetic sensing techniques, such as techniques that use current sensors, are practically unusable in view of the relatively low conductive properties of the CMC and the thermally insulating material. Present techniques for determining the thickness of the insulating material generally involve time-consuming and burdensome tools, such as CMM or bench layout. Thus, there is a need for inspection techniques that may quickly and inexpensively allows evaluating the thickness of the thermal insulation over a ceramic matrix composite substrate material.

BRIEF DESCRIPTION OF THE DRAWINGS

These and other advantages of the invention will be more apparent from the following description in view of the following drawings:

FIG. 1 is a partial cross-sectional view of a composite material embodying aspects of the invention.

FIG. 2 is a cross-section of a layer of a thermally insulating material comprising a distinguishing agent uniformly distributed within the insulating layer.

FIG. 3 is a cross-section along a cutting plane 3-3 in FIG. 2.

FIG. 4 is a cross-section of a layer of a thermally insulating material comprising a distinguishing agent discretely distributed within the insulating layer.

FIG. 5 is a cross-section along a cutting plane 4-4 in FIG. 2.

FIG. 6 is a cross-section of a layer of a thermally insulating material comprising a distinguishing agent distributed to form a distinguishing gradient within the insulating layer.

DETAILED DESCRIPTION OF THE INVENTION

A component (e.g., a gas turbine component) may be formed of a composite material 10 exemplarily illustrated in partial cross-sectional view in FIG. 1. The composite material comprises a structural ceramic matrix composite (CMC) substrate material 12 protected by a layer of ceramic insulating material 14. A layer of adhesive or other bond-enhancing material 16 may optionally be used between the CMC material 12 and the insulating material 14 to establish a chemical bonding therebetween. The composite material 10 may be used to form a vane, combustor, blade ring or other such part of a gas turbine engine that is exposed to a high temperature environment where temperatures may exceed 1,600° C. It will be appreciated that, in lieu of chemical bonding, the layer of insulating material 14 can be attached to substrate material 12 using various other techniques, such as mechanical means, or direct deposition (CVD, PVD, various plasma spray processes) of the insulating material 14 onto the substrate material 12.

The CMC material 12 may be any known composite material having ceramic reinforcing structures, such as reinforcing fibers, disposed in a ceramic matrix material. Both oxide/oxide and non-oxide/non-oxide CMC materials may be used (an oxide/non-oxide material combination is also possible). By way of example, as described in U.S. Pat. No. 6,013,592, also assigned to the present assignee and incorporated herein by reference in its entirety, the thermally insulating material may comprise a plurality of hollow oxide-based spheres 18 of various dimensions, a phosphate binder and an oxide filler powder. The spheres may be situated in the phosphate binder and filler powder such that each sphere is in contact with at least one other sphere in some form of close-packed arrangement, thereby providing dimensional stability to the insulation. It will be understood that the present invention is not limited to the specific form of thermally insulating material described in the foregoing patent being that various forms of the insulating material may equally benefit from the techniques of the present invention. Exemplary variations of the insulating material may comprise insulating material with partially filled spheres or non-contacting spheres or geometric shapes other than spheres. For an example of a hybrid structure comprising a structural ceramic matrix composite (CMC) material coated with a layer of ceramic insulating tiles, reference is made to U.S. patent application Ser. No. 10/767,013 titled "Hybrid structure Using Ceramic Tiles and Method Of Manufacture". See also U.S. patent application Ser. No. 10/767,012 for a description of a hybrid CMC structure that uses a casting process useful to manufacture components with complex geometry, such as tubular-shaped components. Both of the foregoing patent applications are assigned to the present assignee and are herein incorporated by reference in their entirety.

The inventor of the present invention has innovatively recognized that one may introduce a distinguishing agent at predetermined locations relative to the thickness of the insulating material for allowing in-situ inspection of erosion-induced effects in the insulating material, e.g., allowing inspection of the thickness of the insulating material. The thickness information is desirable since the level of exposure of the CMC structural material to high temperature (and hence remaining life expectancy of the CMC structural material) is directly related to the thickness of the insulating material. For example, a remaining thickness of the insulating material may be used for determining an appropriate corrective action before exposing the underlying CMC material to unacceptable high temperatures and avoiding the possibility of non-repairable damage to the CMC structure.

Generally, one would like to detect erosion-induced loss in the thermally insulating material before any damage occurs to the CMC material so that an appropriate repair action is timely performed. For example, it may be valuable to have an indication at the interface between the thermally insulating material and the CMC structural material. In one exemplary embodiment, the distinguishing agent may comprise a coloring agent added to the layer of adhesive material 16. To achieve a desired color, relatively small amounts (typically 0.0001% to 3%) of a suitable chemical compound, such as a transition metal oxide or a rare earth oxide, may be introduced to the layer of adhesive material 16. Examples of some well-known coloring agents may be chromium oxide, titanium oxide, praseodymium oxide, neodymium oxide, etc. It will be appreciated that in this type of application color and color blending are largely based on the chemistry involved, such as the relative abundance or scarcity of oxygen and metallic molecules, and the specific crystal and chemical structure. For example, unlike pigment-based paints, in chemical blending applications, a blending of blue and yellow may result in anything but green. The above-cited coloring agents should be construed in an exemplary sense and not in a limiting sense since one may use any coloring agent that may create a distinguishing color without negatively affecting the performance of the composite, e.g., without affecting the thermo-mechanical properties of the composite.

Preferably, one would like to have more information available than just whether loss of the thermally insulating material has reached the interface with the CMC material. Accordingly, in one exemplary embodiment of a composite material 30, as illustrated in FIGS. 2 and 3, the colorant agent may be distributed uniformly through the entire volume of the thermally insulating material 32. For example, the colorant agent may be introduced into a precursor form of the thermally insulating material (e.g., via thermal spray powder or slurry). The precursor of the thermally insulating material may take any of various forms based on the specific processing technique used for constructing the thermally insulated composite material. For example, a layer of the thermally insulating material 32 can be formed jointly with the structural material 36 and co-fired (sintered or otherwise co-processed) together; insulating layer 32 can be formed (for example, via casting) on the structural material 36 and then fired (sintered or otherwise co-processed) on the material 36 in a controlled manner; structural material 36 can be formed onto the insulating layer 32 directly (via filament winding, tape lay-up, fabric wrapping, etc.) and the structural material 36 may be fired (sintered or processed to final density) in-situ, whereas the thermally insulating material 32 may be a fully densified body, a partially densified body, or a green body prior to forming the structural material 36, or where the insulating layer 32 may form part or all of the tooling required for the formation of the structural material 36. For readers desirous of further background information regarding hybrid ceramic materials composed of insulating and structural ceramic layers, see for example, U.S. Patent Application publication 2003/0207155, which is herein incorporated by reference in its entirety. Regardless of the specific methodology for constructing the thermally insulated CMC structural material, a breach 34 in the insulating material would become evident due to the contrasting color of the thermally insulating material relative to the CMC structure 36 that would become visible through the breach. The area of the breach 34 becomes more clearly visible because of the presence of the distinguishing agent, as illustrated in FIG. 3.

The colorant agent may also be arranged in discrete layers throughout the volume of the thermally insulating material. For example, as illustrated in FIGS. 4 and 5, in one exemplary embodiment of a composite material 50, the insulating material 52 may comprise a plurality of stacked layers, e.g., layers $52_1$ and $52_2$. For example, each layer may comprise a colorant agent chosen to provide a different color between adjacent layers. In this embodiment, ranges for the depth of erosion will be evident based on the different colors for each layer, as illustrated in FIG. 5.

It will be appreciated by those skilled in the art that during the processing of the thermally insulating material there may be various techniques that may be used to introduce an appropriate chemical (e.g., colorant agent) to achieve a desired coloring effect. Examples of such techniques may include chemical vapor deposition, and chemical vapor infiltration. It is contemplated that one need not provide a uniform concentration of the colorant agent throughout the entire thickness of the insulating material. For example, as illustrated in FIG. 6, assuming a chemical vapor infiltration technique is used, at a top region of the thermally insulating material one would achieve a relatively higher concentration of the coloring agent being introduced and then this concentration would decrease as a function of depth till reaching some depth at which the concentration of the colorant agent would be negligible. For some colorant agents, the intensity of the color may be driven by the concentration of the colorant agent. For example, one could configure the insulating material to gradually vary from a relatively darker shade to a lighter shade. Thus, in one exemplary embodiment, in lieu of having a number of discrete bands of color or in lieu of having a uniform distribution of color throughout the thickness of the insulating material, one would achieve a color gradient as a function of depth. For some other colorants, the resulting color may be driven by the concentration of the colorant agent. For example, for concentrations above a certain color-changing threshold the resulting color may be a first color (e.g., red) while for concentrations below the color-changing threshold the resulting color may be a second color different than the first color (e.g., blue). It is contemplated that either of the above-properties may be used for inspecting the depth of erosion in the thermally insulating material.

To avoid the issue of subjectivity that may arise in connection with the screening of color intensity, one may use an appropriate electro-optical instrument, such as an optical calorimeter to quantify the intensity of the color. In this case one may provide to the operator a chart that would correlate a reading from the instrument to a depth range. For example, a reading in a first range of units of color intensity may be equivalent to a first predefined range of depth and a reading in a second range units of units of color intensity may be equivalent to a second predefined range of depth. It will be appreciated that the correlating of the reading from the instrument to a depth range may be implemented in a computerized device, if so desired.

The distinguishing agent has been described so far in terms of a coloring agent. That is, an agent that affects absorption, reflection and refraction of various wavelengths that fall in the visible spectrum of light, such as wavelengths detectable by human vision. It is contemplated, however, that the distinguishing agent introduced into the thermally insulating material may be an agent that affects wavelengths outside the visible spectrum of light, such as infrared, ultraviolet or X-ray spectrum. In this case an appropriate detector would be used to detect effects of the distinguishing agent, such as an infrared, ultraviolet or X-ray detector. Moreover, the colorant agent may be a luminescent colorant. That is, a material that emits light (e.g., visible, IR or UV) upon suitable excitation. Thus, the term "distinguishing" or "coloring agent" should not be interpreted as being restricted to visible light or to non-luminescent materials.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. Method for inspecting a turbine component comprising a thermally insulating layer over a ceramic matrix composite material, the method comprising:
   providing a distinguishing agent indicative of a remaining thickness of said thermally insulating layer, wherein the distinguishing agent comprises a non-luminescent colorant; and
   monitoring visually perceptible color-changing effects of said distinguishing agent to determine a thickness range for said thermally insulating layer.

2. The method of claim 1, further comprising performing a corrective action on the turbine component based on the determined thickness range for said thermally insulating layer.

3. The method of claim 1, wherein said distinguishing agent is introduced into an interface layer disposed between the thermally insulating layer and the ceramic matrix composite material.

4. The method of claim 1, wherein said distinguishing agent is uniformly distributed throughout the thermally insulating layer.

5. The method of claim 1, wherein said distinguishing agent is varyingly distributed throughout the thermally insulating layer to form a distinguishing gradient in the thermally insulating layer.

6. The method of claim 1, wherein the thermally insulating layer comprises a stack of discrete layers, and the distinguishing agent is introduced to form distinctive adjacent layers in the stack of discrete layers.

7. The method of claim 1, wherein said distinguishing agent comprises a coloring agent.

8. The method of claim 7, wherein said coloring agent is selected from the group consisting of transition element oxides and rare earth element oxides.

9. The method of claim 7, wherein said coloring agent is perceptible in a range of an electromagnetic spectrum visible to human vision.

10. The method of claim 1, wherein said distinguishing agent is selected from the group consisting of infrared, ultraviolet, X-ray and visible electromagnetic spectrum.

11. The method of claim 1, wherein the distinguishing agent is introduced in a precursor form of said thermally insulating layer.

12. The method of claim 11, wherein said precursor form is selected from the group consisting of a fully densified body, a partially densified body, and a green body.

* * * * *